United States Patent [19]

Yan

[11] Patent Number: 4,918,625
[45] Date of Patent: Apr. 17, 1990

[54] METHOD AND APPARATUS FOR PROCESSING TRANSLUCENT OBJECTS

[75] Inventor: Johnson K. Yan, Cupertino, Calif.

[73] Assignee: CAE-Link Corporation, Binghamton, N.Y.

[21] Appl. No.: 382,046

[22] Filed: Jul. 18, 1989

Related U.S. Application Data

[63] Continuation of Ser. No. 943,349, Dec. 19, 1986, abandoned.

[51] Int. Cl.[4] .............................................. G06F 15/62
[52] U.S. Cl. .................................... 364/522; 340/729; 340/747
[58] Field of Search ................ 364/521, 522; 340/703, 340/729, 747; 434/38, 43, 69

[56] References Cited

U.S. PATENT DOCUMENTS

| | | | |
|---|---|---|---|
| 4,570,233 | 2/1986 | Yan et al. | 364/522 |
| 4,615,013 | 9/1986 | Yan et al. | 364/521 |
| 4,679,040 | 7/1987 | Yan | 340/747 |

Primary Examiner—Gary V. Harkcom
Assistant Examiner—Mark K. Zimmerman
Attorney, Agent, or Firm—Thomas E. Schatzel; Barry L. Haley

[57] ABSTRACT

A method and apparatus for use in a computer image generator for providing translucency in the scene content of a video processed image as displayed on a cathode ray tube through subpixel processing. The method and apparatus considers the occulting problem of translucent surfaces in a typical computer image generated display. The apparatus and method thereof for processing a translucent object represented by a polygon surface utilizes creation of an array of flag bits per pixel representing a visible bed-of-nails of each polygon surface each of which has its own translucency factor. Each of the surface flag bit signals are processed to provide a logical union between the array of flag bits representing the translucent bed-of-nails of the visible portion of the surface and the array of flag bits stored in the bed-of-nails memory. The final resultant pixel display will be thus representative of the translucency intensities of the various surfaces processed.

1 Claim, 2 Drawing Sheets

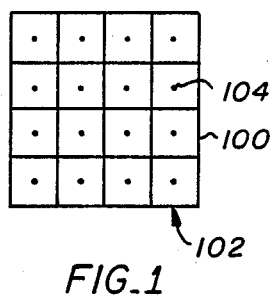
FIG_1
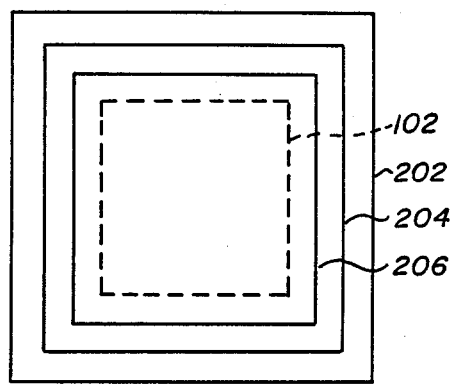
FIG_2
| 1 | 0 | 1 | 0 |
|---|---|---|---|
| 0 | 1 | 0 | 1 |
| 1 | 0 | 1 | 0 |
| 0 | 1 | 0 | 1 |
FIG_3
| 0 | 1 | 0 | 1 |
|---|---|---|---|
| 1 | 0 | 1 | 0 |
| 0 | 1 | 0 | 1 |
| 1 | 0 | 1 | 0 |
FIG_4
| 0 | 1 | 0 | 0 |
|---|---|---|---|
| 1 | 0 | 1 | 0 |
| 0 | 1 | 0 | 0 |
| 0 | 0 | 0 | 0 |
FIG_5
| 0 | 0 | 0 | 1 |
|---|---|---|---|
| 0 | 0 | 0 | 0 |
| 0 | 0 | 0 | 1 |
| 1 | 0 | 1 | 0 |
FIG_6

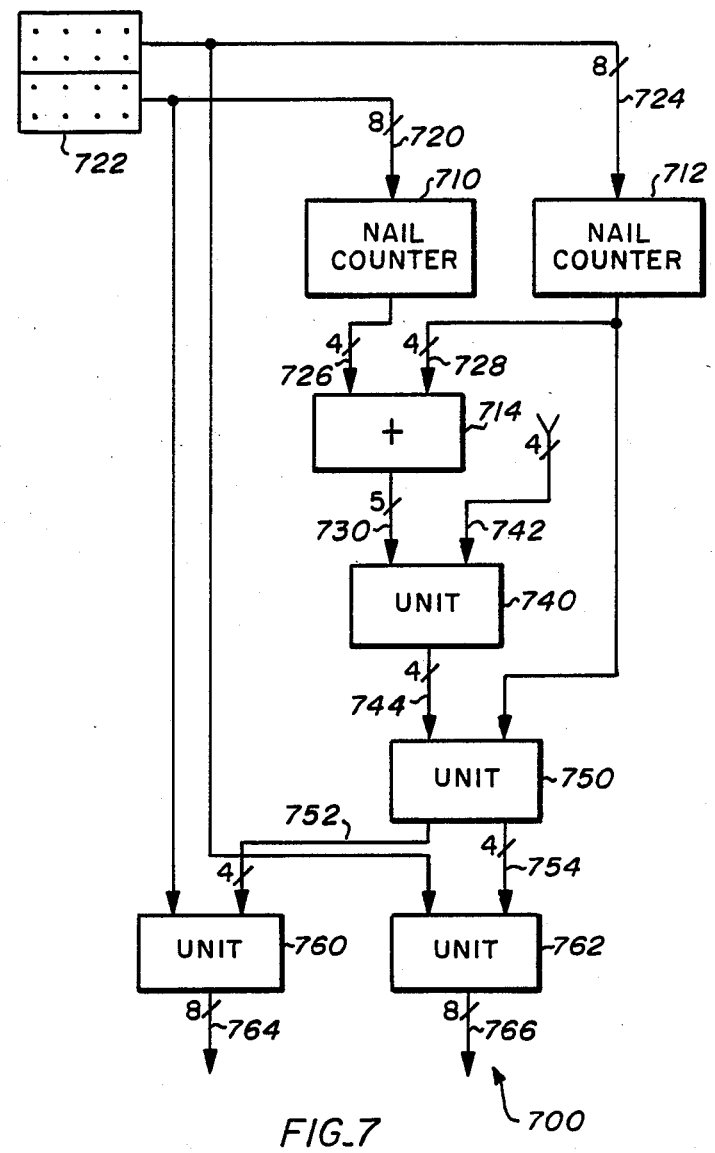
FIG_7

METHOD AND APPARATUS FOR PROCESSING TRANSLUCENT OBJECTS

This is a continuation of Applicant's earlier application Ser. No. 06/943,349, filed Dec. 19, 1986 now abandoned.

TECHNICAL FIELD

The present invention relates to digital image generation for aircraft flight simulators generally and more specifically to a method and an apparatus for processing translucent objects.

BACKGROUND ART

Aircraft flight simulators provide an alternative for pilot training to the use of aircraft, the use of which may, at times, be inconvenient, uneconomical and/or dangerous. Obviously, the validity of such training is in direct relation to the degree to which an aircraft flight simulator reflects the respective aircraft including the interior of the cockpit, the response of the controls and, of course, the view from the window.

Simulation of the view from the window of an aircraft is provided by a system which is referred to as a modular digital image generator (DIG). For details of the modular digital image generator the reader is directed to the U.S. Pat. No. 4,570,233 of Johnson K. Yan and Judit K. Florence.

For purposes of the present invention, it is sufficient to note that the modular digital image generator employs a data base the elements of which define the terrain (including natural formations and cultural structures) of the simulation (gaming) area. Specifically, the terrain is modeled by polygon surfaces (faces) which are defined by a list of edges. Relevant surfaces are processed in a "top-down writing order" in which unocculted surfaces are processed first, followed by surfaces in order of occultation, as presented to the eye of the pilot.

Further, it should be noted that for processing the polygon surfaces, the modular digital image generator employs a "bed of nails" device which provides quantization finer than that of a basic picture element (pixel). Subpixel resolution is used to minimize anomalies and aliasing effects which are evidenced by image "stair stepping", "crawling", "line breakup", and "scintillation".

Specifically, each pixel is subdivided both vertically and horizontally to form a 4×4 array of subpixels. For processing, a "flag bit" is associated with each subpixel. The (total) array of flag bits is referred to as a "bed of nails". For purposes of understanding the operation of the bed of nails device, it is convenient to conceptualize a nail positioned at the center of each subpixel. Hence, for each nail at each subpixel, there is a corresponding flag bit which is turned on (i.e. logic bit "1") if the polygon surface is "pierced" by the nail. Conversely, the flag bit is turned off (i.e. logic bit "0") if the surface is not "pierced" by the nail.

The bed of nails device includes a bed of nails generator, a bed of nails update device having both an [N+P] block and an [N−P] block, and a bed of nails memory. Both the [N+P] and the [N−P] blocks are connected to be driven by the bed of nails generator. The bed of nails memory is connected both to be driven by the [N+P] block and to drive both the [N+P] and the [N−P] blocks. (The [N] signifies a "new" polygon surface (one currently being processed by the bed of nails generator); and, the [P] signifies a composite of the "previous" polygon surfaces (ones previously processed and stored in the bed of nails memory)).

The bed of nails generator generates the bed of nails (of a 2×2 pixel array area of a portion) of a (new [N]) polygon surface. The [N−P] block performs a logical function, one which corresponds to the logical difference between (the 2×2 pixel array area of) the previous polygon surfaces [P] and (the similar area of) the new [N] surface. In other words, the [N−P] block develops an array of flag bits which delineate the "visible" (unocculted) portion of the surface. This "visible bed of nails" is used by the modular digital image generator to determine the fractional area (of the 2×2 pixel array area) covered by the visible portion of the surface, from which a suitable pixel intensity is developed.

The [N+P] block performs another logical function, one which corresponds to the logical union of (the 2×2 pixel area of (the previous polygon surfaces [P] and (the similar area of) the new [N] polygon surface. In other words, the [N+P] block develops an array of flag bits which delineates the total area covered by all of the surfaces which have been processed. Finally, the bed of nails memory stores the result of the [N+P] logical union for further processing.

Although the modular digital image generator is effective in representing opaque terrain, a need exists to additionally represent translucent objects such as clouds, smoke, and dynamic shadowing effects.

DISCLOSURE OF THE INVENTION

Accordingly, it the primary object of the present invention is to provide a method and an apparatus for processing translucent objects.

Another object of the present invention is to provide a simplified terrain processing apparatus.

These and other objects of the present invention are realized by a method which employs the step of developing an array of flag bits which delineates the visible portion of a polygon surface (a "visible bed of nails" of the surface) and the step of changing the state of the flag bits from "1" to "0" in direct proportion to the translucency factor of the surface.

BRIEF DESCRIPTION OF THE FIGURES IN THE DRAWINGS

These and other objects of the present invention will no doubt become apparent to those skilled in the art after having read the detailed description of the presently preferred method and embodiment of the present invention which are illustrated in the figures of the drawing.

FIG. 1 is a diagramatic representation of a pixel subdivided into sixteen subpixels;

FIG. 2 is a diagramatic representation of the pixel shown in FIG. 1 covered by each of three polygon surfaces;

FIG. 3 is a diagramatic representation of the translucent bed of nails of the visible portion of the top most surface shown in FIG. 2;

FIG. 4 is a diagramatic representation of the visible bed of nails of the second top most surface shown in FIG. 2;

FIG. 5 is a diagramatic representation of the translucent bed of nails of the visible portion of the second top most surface shown in FIG. 2;

FIG. 6 is a diagramatic representation of the visible bed of nails of the bottom most surface surface shown in FIG. 2; and FIG. 7 is a block diagram of the presently preferred embodiment of an apparatus for cutting holes in a visible bed of nails.

BEST MODE FOR CARRYING OUT THE INVENTION

In accordance with the present invention, the presently preferred method of processing a translucent object represented by a polygon surface employs the step of developing an array of flag bits which delineates the visible polygon surface (a "visible bed of nails" of the surface) and the step of cutting a number of holes in the visible bed of nails by changing the state of the flag bits from "1" to "0" in direct proportion to the translucency factor of the surface.

Since the translucent polygon surface may be at least partially occulted by one or more other polygon surfaces, in developing the visible bed of nails of the translucent surface, the translucent surface is processed with the other surfaces in a top-down writing order. Specifically, performed is the step of initializing a bed of nails memory by storing therein an array of flag bits each of which is "0" and, then, the step of processing in the top-down writing order each of the surfaces.

Included in processing each of the polygon surfaces are the steps of generating an array of flag bits which represents the bad of nails of the surface currently being processed and, then, computing the logical difference [N−P] between the array of flag bits representing the bed of nails of the current surface [N] and the flag hits stored in the bed of nails memory [P] to develop an array of flag bits representing the visible bed of nails of the current surface. Also included in processing each of the surfaces is the step of changing the state of the flag bits of the visible bed of nails of the current surface from "1" to "0" in direct proportion to the translucency factor of the current surface to develop a "translucent bed of nails of the visible portion of the current surface" [T]. The translucent bed of nails of the visible portion of the current surface is used in computing the color contribution of the surface. Finally, in processing each of the surfaces is the step of computing the logical union [T+P] between the array of flag bits representing the translucent bed of nails of the visible portion of the current surface [T] and the flag bits stored in the bed of nails memory [P] to develop an array of flag bits which delineate the total area covered by all of the surfaces which have been processed and, then, the step of storing in the bed of nails memory the array of flag bits which delineate the total area covered by all of the surfaces which have been processed.

Consider the following example. Although the number of nails and their arrangement is not important to the method of the present invention, a rectangular array of sixteen nails per pixel is assumed, as is illustrated in FIG. 1 of the drawing. Specifically, a pixel, that is generally designated by the number 102, is shown with sixteen nails, which include a pair of nail that are designated 104 and 100. In FIG. 2, pixel 102 is shown totally covered by each of three polygon surfaces, that are respectively designated 202, 204, and 206. The top two surfaces, surface 202 and surface 204, are half (50%) translucent while surface 206 is opaque (0% translucent). Thus, the array of flag bits representing the visible bed of nails of surface 202 are all "1"s. Surface 202 is made half translucent by cutting holes in the visible bed of nails by changing from "1" to "0" the state of half of the the flag bits to develop the translucent bed of nails of the visible portion of the surface, as illustrated in FIG. 3. The color contribution of surface 202 is, therefore, one-half (50%) of its color. The array of flag bits representing the translucent bed of nails of the visible portion of surface 202 is stored in the bed of nails memory.

Polygon surface 204 is processed next. The visible bed of nails of surface 204 is obtained by computing the logical difference between the array of flag bits representing the bed of nails of surface 204 (all "1"s) and the array of flag bits representing the translucent bed of nails of the visible portion of surface 202 (the later being stored in the bed of nails memory). The visible bed of nails of surface 204 is illustrated in FIG. 4. The translucent bed of nails of the visible portion of surface 204 is obtained by cutting four holes in the "1" flag bits of the visible bed of nails of the surface, as illustrated in FIG. 5. The color contribution of surface 204 is, thus, one-fourth (25%) of its color. The result of computing the logical union between the array of flag bits representing the translucent bed of nails of the visible portion of surface 204 and the array of flag bits stored in the bed of nails memory is stored in the bed of nails memory.

Finally polygon surface 206 is processed. The visible bed of nails of surface 206 is the logical difference between the array of flag bits representing the bed of nails of surface 206 (again, all "1"s) and the array of flag bits stored in the bed of nails memory. The visible bed of nails of surface 206 is illustrated in FIG. 6. The color contribution of surface 206 is, therefore, one-fourth (25%) of its color. The final resultant pixel color is, therefore, one-half (50%) of the color of surface 202 plus one-fourth (25%) of the color of surface 204 plus one-fourth (25%) of the color of surface 206, which is the correct color due to the three polygon surfaces when translucency is taken into account.

An apparatus for cutting a number of holes in a visible bed of nails of a polygon surface by changing the state of the flag bits from "1" to "0" in direct proportion to the translucency factor of the surface employs a unit that includes a number of memory devices storing a "look-up" table. The unit includes twenty address inputs, sixteen of which are connected each to receive a signal representing the state of a respective one of the visible bed of nails flag bits. The remaining four address inputs of the unit are connected to receive four signals representing in binary notation the translucency factor of the surface. Additionally, the unit includes sixteen data outputs at which the unit develops sixteen signals each representing the state of a respective one of the flag bits of the translucent bed of nails of the visible portion of the surface. Although effective, the unit requires sixteen million bits (16 megabits) (cells) of storage.

To reduce the number of cells of storage required, the presently preferred embodiment of an apparatus for cutting holes in a visible bed of nails of a polygon surface, processes as two groups of eight, the sixteen signals representing the visible bed of nails flag bits. Specifically, the apparatus, which is shown in FIG. 7 generally designated 700, employs a pair of "nail counters", designated 710 and 712, and an adder (+) 714, the combination for developing signals representing a count of the number of the visible bed of nails flag bits which are "1". For this purpose, each of the nail counters (710 and 712) includes a number of memory devices (256 by 4) storing a "look-up" table for developing signals representing a partial (half) count. Each of the nail counters (710 and 712) includes eight address inputs and four data outputs. The eight address inputs of nail counter 710 are connected each to a respective line of an eight line bus 720 to receive a signal representing the state of a respective one of the lower eight flag bits of the visible bed of nails represented by a block 722. Similarly, the eight address inputs of nail counter 712 are connected each to a respective line of another eight line bus 724 to receive a signal representing the state of a respective one of the upper eight flag bits of the visible bed of nails. The four data outputs of nail counter 710 are connected each to a respective line of a four line bus 726; and, the four data outputs of nail counter 712 are connected each to a respective line of another four line bus 728.

Adder (+) 714 combines the partial counts developed by nail counters 710 and 712 to develop the full count. Adder 714 includes a set of four addend inputs, each of which is connected to a respective line of the four lines of bus 726, another set of four addend inputs, each of which is connected to a respective line of the four lines of bus 728, and five sum outputs, each of which is connected to a respective line of a five line bus 730. In the presently preferred embodiment, adder 714 includes a number of memory devices (256 by 5) storing a "look-up" table.

Additionally, apparatus 700 employs a unit 740 that includes a number of memory devices (512 by 4) storing a "look-up" table for developing signals representing a count of the total number of holes to out in the visible bed of nails. Unit 740 includes nine address inputs and four data outputs. Five of the nine address inputs of unit 740 are connected, each to a respective line of the five lines bus 730, to receive signals representing the count of the number of the visible bed of nails flag bits which are "1". The remaining four of the nine address inputs of unit 740 are connected, each to a respective line of a four line bus 742, to receive signals representing the translucency factor of the surface. The four data outputs of unit 740 are connected each to a respective line of a four line bus 744.

Further, apparatus 700 employs a unit 750 that includes a number of memory devices (256 by 8) storing a "look-up" table for apportioning the holes to cut between the two groups of visible bed of nails flag bits. Unit 750 includes eight address inputs and eight data outputs. Four of the eight address inputs of unit 750 are connected, each to a respective line of the four lines bus 744, to receive signals representing the count of the total number of holes to cut. The remaining four of the eight address inputs of unit 750 are connected, each to a respective line of the four lines of bus 728, to receive the signals representing the partial (half) count. The eight data outputs of unit 750 are connected, four each to a respective line of a four line bus 752 and four each to a respective line of another four line bus 754.

Finally, apparatus 700 employs a pair of units, designated 760 and 762. Each of units 760 and 762 includes a number of memory devices (4096 by 8) storing a "lookup" table for specifying where in the respective group of visible bed of nails flag bits the holes are to be cut. Each of units 760 and 762 includes twelve address inputs and eight data outputs. Four of the twelve address inputs of unit 760 are connected, each to a respective line of the four lines bus 752; and, four of the twelve address inputs of unit 762 are connected, each to a respective line of the four lines of bus 754, to receive signals representing the number of holes to cut. The remaining eight of the twelve address inputs of unit 760 are connected, each to a respective line of the eight lines of bus 720; and, the remaining eight of the twelve address inputs of unit 762 are connected, each to a respective line of the eight lines of bus 724, to receive the signals representing the states of the respective group of flag bits of the visible bed of nails. The eight data outputs of unit 760 are connected each to a respective line of an eight line bus 764; and, the eight data outputs of unit 762 are connected each to a respective line of another eight line bus 766. On the combination of the lines of buses 764 and 766, units 760 and 762 develop signals each representing a respective one of the flag bits of the translucent bed of nails of the visible portion of the polygon surface. Thus, apparatus 700 only requires approximately 40,000 bits (40 kilobits) (cells) of storage.

A number limitations are associated with the present method. First, the number of levels of translucency that can be assigned to a polygon surface depends on the number of "1" flag bits in the visible bed of nails of the surface. (Any translucency factor assigned to a surface is "quantized" to the nearest level available for its visible bed of nails.) For example, with sixteen nails per pixel, when the flag bits are all "1"s, there are only sixteen levels of translucency. In such a situation, cutting one hole in the visible bed of nails gives the polygon surface a translucency factor of 1/16; cutting fifteen holes gives a translucency factor of 15/16. In the example, no quantization was necessary. Had a translucency factor of 54% been assigned to polygon surface 202, it would have been necessary to quantize the translucency factor to 50%. Also, notice that as the number of "1" flag bits of the visible bed of nails of polygon surfaces tend to decrease toward the bottom of a stack of surfaces on a pixel, the number of levels of translucency available also decreases. For example, if polygon surfaces 202 and 204 were both assigned a translucency factor of 1/16, the visible bed of nails of surface 204 will contain only one "1" flag bit. As a consequence, only two levels of translucency are available for surface 204, namely, either totally translucent or totally opaque. Since the assigned translucency factor is closer to total translucency, it would be quantized to be totally translucent.

Another limitation associated with the present method is that pixels covered by internal edges and internal vertices of a translucent polygon surface might have the translucency of the surface quantized to a slightly different value than pixels totally covered by the surface.

Further, the present method has an associated aliasing limitation. Consider, for example, the situation in which a translucent polygon surface entirely covers the screen and the entire opaque scene behind it (e.g. smoke screen). If the translucent polygon surface has a translucency factor of 1/16, than only one hole is cut in its bed of nails for each pixel. As far as the processing of the lower priority order opaque polygons surfaces are concerned, they are point sampled through a single hole per pixel. This is equivalent, as far as processing of of the lower priority order opaque polygons surfaces are concerned, to "pure sampling", or spatial filtering with only one "subpixel" on each pixel. Fortunately, in this case, only 1/16 of the energy of the aliased image behind the translucent polygon surface is shown through. If the translucent polygon surface has a translucency factor of 2/16, then ⅛ of the energy behind will be shown through; but, now, the spatial filtering of the opaque polygons is equivalent to spatial filtering with two subpixels on each pixel.

More apparent levels of translucency can be obtained by using more subpixels in each pixel (perhaps 64 subpixels). This, however, is expensive. Another approach to obtain more apparent levels of translucency is to cut holes in the flag bits of a block of two by two pixels (four adjacent pixels) to get 64 apparent levels of translucency. For example, if a translucency factor of 1/64 is required, then only one hole is cub in one of the four adjacent pixels.

What is claimed is:

1. An apparatus for receiving a plurality of signals each representing a state of a flag bit of an array of flag bits representing a visible bed of nails of a polygon surface and for receiving a plurality of signals representing a translucency factor for the polygon surface and for developing a plurality of signals each representing a flag bit of an array of flag bits representing a translucent bed of nails of the visible bed of nails of the visible portion of the polygon surface, the apparatus comprising in combination:

first nail counter means responsive to a first portion of the visible bed of nails signals and operative to develop a plurality of signals which represent a number of flag bits represented by said first portion of said visible bed of nails signals that have a predetermined state;

second nail counter means responsive to a second portion of said visible bed of nails signals and operative to develop a plurality of signals which represent the number of flag bits represented by said second portion of said visible bed of nails signals that have said predetermined state;

adder means connected to said first and said second nail counter means, said adder means being responsive to said first and said second nail counter means developed signals and operative to develop a plurality of signals which represent the number of flag bits of said visible bed of nails signals that have said predetermined state;

first means connected to said adder means, said first means for receiving said adder means developed signals and for receiving the signals representing the translucency factor for the polygon surface and for developing a plurality of signals which represent a count of a total number of holes to cut in the visible bed of nails;

second means connected to said first means and to said second nail counter means, said second means for receiving said first means developed signals and for receiving said second nail counter means developed signals and for developing a plurality of signals apportioning the holes to cut between said first portion of said visible bed of nails signals and said second portion of said visible bed of nails signals;

third means connected to said second means, said third means for receiving said second means developed signals and for receiving said first portion of said visible bed of nails signals and for developing a portion of the translucent bed of nails of said visible bed of nails of said visible portion of said polygon surface signals; and fourth means connected to said second means, said fourth means for receiving said second means developed signals and for receiving said second portion of said visible bed of nails signals and for developing a portion of said translucent bed of nails of said visible bed of nails of said visible portion of said polygon surface signals.

* * * * *